United States Patent
Lin

(10) Patent No.: US 8,116,322 B2
(45) Date of Patent: Feb. 14, 2012

(54) METHOD AND APPARATUS FOR CONTROLLING REPORTING OF AN EVENT TIMESTAMP

(75) Inventor: Yangbo Lin, Shenzhen (CN)

(73) Assignee: Huawei Technologies Co., Ltd, Shenzhen, Guangdong ( * ) Notice: Subject to any disclaimer, the term of this patent is extended or adjusted under 35 U.S.C. 154(b) by 326 days.

(21) Appl. No.: 12/354,289

(22) Filed: Jan. 15, 2009

(65) Prior Publication Data

US 2009/0122803 A1    May 14, 2009

Related U.S. Application Data

(63) Continuation of application No. PCT/CN2007/071400, filed on Dec. 29, 2007.

(30) Foreign Application Priority Data

Dec. 30, 2006 (CN) .......................... 2006 1 0170447

(51) Int. Cl.
*H04L 12/28* (2006.01)
(52) U.S. Cl. ................................. 370/395.62
(58) Field of Classification Search ........................ None
See application file for complete search history.

(56) References Cited

U.S. PATENT DOCUMENTS

| | | | | |
|---|---|---|---|---|
| 6,256,315 B1 * | 7/2001 | Barbas et al. | ................. | 370/412 |
| 6,751,573 B1 * | 6/2004 | Burch | .......................... | 702/178 |
| 6,862,619 B1 * | 3/2005 | Sugauchi et al. | ............ | 709/224 |
| 7,103,002 B2 * | 9/2006 | Bjelland et al. | .............. | 370/242 |
| 7,453,893 B2 * | 11/2008 | Li et al. | ......................... | 370/401 |
| 7,869,449 B2 * | 1/2011 | Lin | ................ | 370/401 |
| 7,933,295 B2 * | 4/2011 | Thi et al. | ....................... | 370/493 |
| 2002/0006114 A1 * | 1/2002 | Bjelland et al. | ............... | 370/248 |
| 2002/0006780 A1 * | 1/2002 | Bjelland et al. | ............... | 455/406 |
| 2002/0061012 A1 * | 5/2002 | Thi et al. | ....................... | 370/352 |
| 2003/0009337 A1 * | 1/2003 | Rupsis | ......................... | 704/260 |

(Continued)

FOREIGN PATENT DOCUMENTS

CN    1728869 A    2/2006

(Continued)

OTHER PUBLICATIONS

Rosen, B., "VoIp gateways and the Megaco architecture", BT Technol J vol. 19 No. Apr. 2, 2011.*

(Continued)

*Primary Examiner* — Ayaz Sheikh
*Assistant Examiner* — Faiyazkhan Ghafoerkhan
(74) *Attorney, Agent, or Firm* — Brinks Hofer Gilson & Lione

(57) ABSTRACT

The present invention discloses a method for controlling the reporting of an event timestamp. The method includes the following steps: a timestamp control parameter is set; the MG determines whether to report the timestamp of the event according to the timestamp control parameter. Further, the present invention discloses an MG and an MGC. The technical solution provided by the present invention controls the MG to report the timestamp of an event; enables the MGC or other applications that require the timestamp of the event to determine the actual time when the event appears according to the obtained timestamp; and controls the reported event not to include the timestamp if the MGC or other applications do not need the timestamp of the event, thus saving the bandwidth resources and other system resources.

7 Claims, 2 Drawing Sheets

U.S. PATENT DOCUMENTS

| | | | | |
|---|---|---|---|---|
| 2003/0058807 | A1* | 3/2003 | Hoffmann | 370/286 |
| 2003/0078942 | A1* | 4/2003 | Childress et al. | 707/200 |
| 2004/0062271 | A1* | 4/2004 | Oliver et al. | 370/466 |
| 2004/0240389 | A1* | 12/2004 | Bessis et al. | 370/252 |
| 2005/0094623 | A1* | 5/2005 | D'Eletto | 370/352 |
| 2005/0254526 | A1* | 11/2005 | Wang et al. | 370/503 |
| 2006/0056459 | A1* | 3/2006 | Stratton et al. | 370/503 |
| 2006/0227706 | A1* | 10/2006 | Burst | 370/229 |
| 2007/0005984 | A1* | 1/2007 | Florencio et al. | 713/178 |
| 2008/0080541 | A1* | 4/2008 | Luo | 370/410 |
| 2008/0080702 | A1* | 4/2008 | Zhang et al. | 379/406.08 |
| 2009/0129285 | A1* | 5/2009 | Lin | 370/252 |

FOREIGN PATENT DOCUMENTS

| | | |
|---|---|---|
| CN | 1809218 A | 7/2006 |
| CN | 1874345 A | 12/2006 |
| EP | 1 713 229 A1 | 10/2006 |

OTHER PUBLICATIONS

Pantaleo, M., "Draft Megaco/H.248v2", draft-ietf-megaco-h248v2-00.txt, Ericsson Nov. 2001.*

Rosen, B., "VoIp gateways and the Megaco architecture", BT Technol J Vol19 No. Apr. 2, 2011.*

Pantaleo, M., "Draft Megaco/H.248v2", draft-ietf-megaco-h248v2-OO.txt, Ericsson Nov. 2001.*

International Search Report issued in corresponding PCT Application PCT/CN2007/071400; mailed Apr. 3, 2008.

Office Action issued in corresponding Chinese Patent Application No. 2006101704479; issued Feb. 17, 2009.

Brahmanapally, Madhubabu et al. "Megaco/H.248 Call Flow Examples; draft-ietf-megaco-callflows-04.txt" IETF Standard Working Draft, Internet Engineering Task Force, IETF, CH vol, megaco, No. 4; Nov. 12, 2004.

Search Report from corresponding European Patent Application No. 07846226.4; issued Jul. 7, 2009.

"Series H: Audiovisual and Multimedia Systems Infrastructure of Audiovisual Services—Communication Procedures, Gateway Control Protocol: Version 2" International Telecommunication Union—Telecommunication Standardization Sector of ITU. Mar. 2004.

"Series H: Audiovisual and Multimedia Systems Infrastructure of Audiovisual Services—Communication Procedures, Gateway Control Protocol: Version 3" International Telecommunication Union—Telecommunication Standardization Sector of ITU. Sep. 2005.

Jacobson, V. et al. "TCP Extensions for High Performance" IETF. May 1992.

Andreasen, F. et al. Media Gateway Control Protocol (MGCP). The Internet Society. Jan. 2003.

Groves, C. et al. "Gateway Control Protocol Version 1" The Internet Society. Jun. 2003.

Written Opinion of the International Searching Authority issued in corresponding PCT Application No. PCT/CN2007/071400; mailed Apr. 3, 2008.

Chinese Office Action issued in corresponding Chinese Patent Application No. 2006101704479; issued Aug. 21, 2009.

Office Action issued in corresponding European Patent Application No. 07 846 226.4; issued May 26, 2010.

Communication issued in corresponding European Patent Application No. 07846226.4, mailed Dec. 1, 2010.

* cited by examiner

METHOD AND APPARATUS FOR CONTROLLING REPORTING OF AN EVENT TIMESTAMP

CROSS REFERENCES TO RELATED APPLICATIONS

This application is a continuation application of PCT/CN2007/071400, filed Dec. 29, 2007, which claims priority to the Chinese Patent Application No. 200610170447.9, filed with the Chinese Patent Office on Dec. 30, 2006 and entitled "Method and Apparatus for Controlling Reporting of an Event Timestamp", contents of which are incorporated herein by reference in their entirety.

FIELD OF THE DISCLOSURE

The present disclosure relates to a gateway control technology, and in particular, to a method, a Media Gateway (MG), and a Media Gateway Controller (MGC) for controlling the reporting of an timestamp.

BACKGROUND

A Media Gateway Controller (MGC) and a Media Gateway (MG) are two key network components in a Packet Switched (PS) network. The MGC is responsible for the call control function, and the MG is responsible for the service bearer function. In this way, the MGC and the MG can work together to separate the call control plane from the service bearer plane, thus fully sharing network resources and simplifying the equipment upgrade and the service extension. The main protocol for communication between the MG and the MGC is the media gateway control protocol. The widely used media gateway control protocols include the Gateway Control Protocol (H.248) and the Media Gateway Control Protocol (MGCP).

Based on the Gateway Control Protocol (H.284), various resources on the MG are represented by termination abstractly. The termination is categorized into physical termination and ephemeral termination. The physical termination represents physical entities that have characteristic of semi-permanent existence, for example, Time Division Multiplex (TDM) channels. The ephemeral termination represents the public resources that are applied for ephemeral purpose, for example, Real-time Transport Protocol (RTP) streams. Besides the preceding common terminations, there is a special termination called Root termination which represents the whole MG. Moreover, the combination of terminations is represented by context. A context may include multiple terminations so the association between terminations may be described by using the topology of the terminations. The terminations that are not correlated with other terminations are contained in a special context called Null context.

Based on the abstract model of the preceding protocol, a call connection is actually an operation on the termination and the context. Such operation is performed through command requested and reply between the MGC and the MG. Commands include Add, Modify, Subtract, Move, AuditValue, AuditCapabilities, Notify, and ServiceChange. Command parameters, also called descriptors, are categorized into property, signal, event, and statistic. The parameters with service relevance are logically aggregated into a package.

An event refers to some possible conditions that a MG needs to monitor, for example, offhook, onhook, dialing, hookflash or network fault, quality alarm, and timer timeout. The occurrence of these conditions may trigger the MG to notify the event to the MGC and/or the MG to take certain actions. Generally, an event is sent by the MGC to the MG or is preset on the MG. The event is identified in a format of PackageID/EventID, and attached with a RequestedID and other necessary parameters. A sent event is also called a requested event. Once the MG detects the occurrence of the event, the MG reports the event to the MGC. The event is also identified in a format of PackageID/EventID, and attached with the RequestedID and other necessary parameters same as the preceding ones. A reported event is also called an observed event.

A event report may include a TimeStamp parameter. The timestamp parameter refers to the actual time when the MG detects the occurrence of the event. This parameter consists of a date and/or a time. In the prior art, the timestamp parameter is optional. The MG determines whether the timestamp parameter needs to be carried in the event report. Therefore, if the application needs to know the actual time when the MG detects the occurrence of the event for the purposes of analysis, summarizing, prediction, and decision, the MG is required to report the event including the timestamp. In particular, if the application needs background processing, the time information provided by the timestamp may be stored for reference in the subsequent processing. However, because the timestamp parameter is optional, the MG may not report the timestamp parameter even if some applications require this parameter. In reverse, as the MG determines whether the timestamp parameter needs to be carried by the event report to the MGC, the timestamp parameter carried by the event report may be useless for the MGC and other applications. Therefore, the timestamp is redundant and unnecessary, thus wasting the bandwidth resources and other resources of the system. Thus, there is an urgent need for a method for controlling the reporting of an event timestamp so that the reporting of timestamp can be controlled according to the requirement of an event for the timestamp in the case of event report.

SUMMARY OF THE DISCLOSURE

An embodiment of the present disclosure provides a method for controlling the reporting of an event timestamp. This method can be used to control whether the MG needs to report the timestamp of the event.

To achieve the preceding objective, the technical solution in an embodiment of the present disclosure is described below.

An embodiment of the present disclosure provides a method for controlling the reporting of an event timestamp. The method includes setting a timestamp control parameter and determining, by an MG, whether to report the timestamp according to the timestamp control parameter.

Further, the present disclosure provides an MG and an MGC.

The MG includes a setting unit adapted to set a timestamp control parameter according to the timestamp control parameter received from the MGC or preset the timestamp control parameter and an executing unit adapted to decide the MG whether to report an timestamp according to the timestamp control parameter set by the setting unit.

The MGC includes a setting unit adapted to set a timestamp control parameter and a sending unit adapted to send to an MG the timestamp control parameter set by the setting unit.

In the technical solution for controlling the reporting of the timestamp of an event in an embodiment of the present disclosure, a timestamp control parameter is set so that the MG can decide whether to report the timestamp of the event according to the set timestamp control parameter, thus controlling the reporting of the timestamp of an event. The technical solution in an embodiment of the present disclosure controls the MG to report the timestamp of an event, enables the MGC or other applications that require the timestamp of the event to obtain the actual time when the event occurs according to the obtained timestamp, and controls the event reported not to include the timestamp if the MGC or other applications do not need the timestamp of the event, thus saving the bandwidth resources and other system resources.

DETAILED DESCRIPTION

For better understanding of the objective, technical solution, and merits of embodiments of the present disclosure, the embodiments of the present disclosure are hereinafter described in detail with reference to accompanying drawings and embodiments.

In embodiments of the present disclosure, a timestamp control parameter is set. The MG determines whether to report the timestamp of the event according to the value of the set timestamp control parameter. The timestamp control parameter may be sent by the MGC to the MG or preset on the MG.

In the embodiments of the present disclosure, the timestamp control parameter may be set for a termination or an event. If the timestamp parameter is set for a termination, it means that the termination executes the corresponding operation according to the set timestamp control parameter when the termination reports any event. If the timestamp parameter is set for an event, it means that the termination, for which an event is set, executes the corresponding operation according to the set timestamp control parameter when the termination reports this event. The setting of a timestamp control parameter may be initiated by an MGC or other applications or may be performed by the MGC according to the instruction from other applications.

Figure 1:
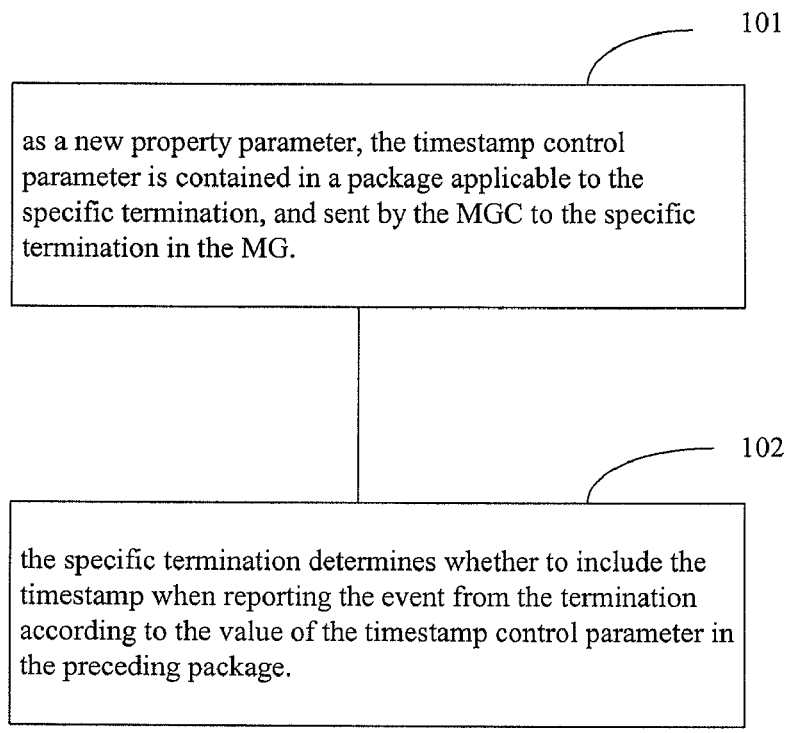
FIG. 1 is a flowchart of the first embodiment of the disclosure.

FIG. 1 is a flowchart of the first embodiment of the disclosure, wherein the timestamp control parameter is set for a termination. The detailed process is as follows:

In step 101, as a new property parameter, the timestamp control parameter is contained in a package applicable to the specific termination and sent by the MGC to the specific termination in the MG. The package may be an existing package or new package based on the Gateway Control Protocol (H.248).

The value of the preceding timestamp control parameter may be one, two, or all of these items: Requested, Suppressed, and Automatic. Specifically, if the value of the timestamp control parameter is set to Requested, Suppressed, or Automatic only, the value of the timestamp control parameter is fixed, and the MG cannot choose the value freely according to the actual conditions. If the timestamp control parameter can be set to Requested and Suppressed, the MG can choose either of them according to the actual conditions. If the timestamp control parameter can be set to Requested, Suppressed, and Automatic, the MG can choose any of the three values according to the actual conditions. If the value of the timestamp control parameter is Requested, it means that the MG includes the timestamp when reporting the event from the termination. If the value of the timestamp control parameter is Suppressed, it means that the MG does not include the timestamp when reporting the event from the termination. If the value of the timestamp control parameter is Automatic, it means that the MGC does not indicate whether to include the timestamp when reporting the event from the termination, but the MG can make decision independently.

The timestamp control parameter can be set in another way, that is, setting whether the timestamp control parameter to appear to instruct the MG about whether to include the timestamp in the event to be reported. The setting may be: (i) when a timestamp control parameter appears, the MG reports the timestamp; when no timestamp control parameter appears, the MG does not report the timestamp; or (ii) when no timestamp control parameter appears, the MG reports the timestamp; when a timestamp control parameter appears, the MG does not report the timestamp. Here, non-appearance of timestamp control parameter may be considered a mode of setting the timestamp control parameter.

The selection of the setting way of the timestamp control parameter and the form of the timestamp control parameter depend on the actual requirement. For example, the MGC can select the way of setting a value. If the MGC does not require the timestamp parameter to be carried in the event report by the specific termination, the timestamp control parameter may be set to Suppressed. If the MGC requires the timestamp parameter to be carried in the event report by the specific termination, the timestamp control parameter can be set to Requested. If the MGC does not care whether the timestamp is carried in the event report by the specific termination, the timestamp control parameter can be set to Automatic. Nevertheless, the MGC can set whether the timestamp control parameter occurs.

The MGC may send the timestamp control parameter when an application or the MGC requires the timestamp carried in the event reported by the termination or at any other time.

In step 102, the specific termination determines whether to include the timestamp when reporting the event from the termination according to the value of the timestamp control parameter in the preceding package.

The effective scope of the timestamp control parameter may vary with the type of the termination. If the termination is the Root termination, it means that the MG determines whether to include the timestamp when reporting any event according to the value of the timestamp control parameter. If the termination is a normal termination, it means that the MG determines whether to include the timestamp when reporting any event from the termination according to the value of the timestamp control parameter. The detailed information about whether to include the timestamp when reporting the event is described in step 101 so it is omitted here.

In this preferred embodiment, the MGC can negotiate with the MG about the setting of the timestamp control parameter for the specific termination beforehand rather than taking the step of dynamic sending in step 101. In this case, the timestamp control parameter can also be included in a package applicable to the specific termination as a new property parameter.

Nevertheless, in this preferred embodiment, the timestamp control parameter can be set repeatedly for a certain termination. In this case, the previously set timestamp control parameter is invalid, and the termination determines whether to report the timestamp according to the currently sent timestamp control parameter.

Figure 2:
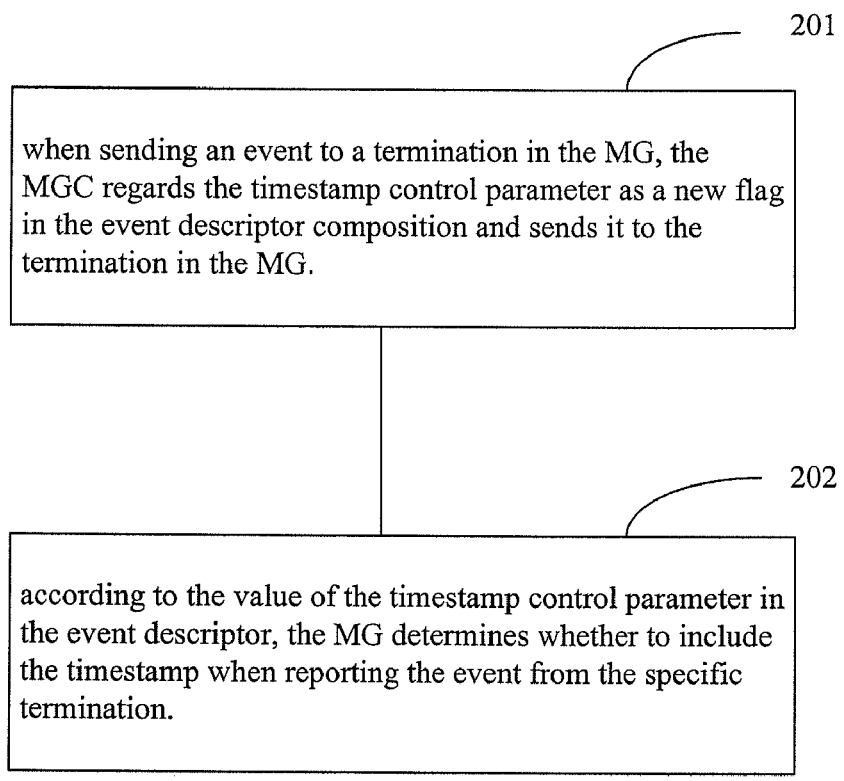
FIG. 2 is a flowchart of the second embodiment of the disclosure.

FIG. 2 is a flowchart of the second embodiment of the disclosure, wherein the timestamp control parameter is set for an event. The detailed process is described below.

In step 201, when sending an event to a termination in the MG, the MGC regards the timestamp control parameter as a new flag in the event descriptor composition and sends the timestamp control parameter to the termination in the MG.

For example, the general flag is named Timestamp Request flag. In this way, the event descriptor composition has a new Timestamp Request flag on the basis of the existing EventName, StreamID, KeepActive flag, NotifyBehaviour flag, ResetEventsDescriptor flag and other parameters. Such flags and parameters are optional for all events.

Here the optional setting mode and the form of the timestamp control parameter are the same as the first preferred embodiment and can be determined according to the current needs. The time for the MGC to send a timestamp control parameter to MG may be the same as that of the first preferred embodiment and is not described here any further.

In step 202, according to the value of the timestamp control parameter in the event descriptor, the MG determines whether to include the timestamp when reporting the event from the specific termination.

According to the timestamp control parameter, the MG determines whether to include the timestamp when reporting the event from the specific termination. For details, refer to the first preferred embodiment described above. Nevertheless, the termination may be the Root termination or a normal termination. If the termination is the Root termination, the process involves reporting of all such events on the MG. If the termination is a normal termination, the process involves reporting of such events of the normal termination only. Therefore, the timestamp control parameter of such events can be set for the Root termination in order to enable the MG to control the timestamps of all such events.

In this preferred embodiment, the dynamic sending in step 201 is not used. Instead, the MGC negotiate with the MG in advance to set the timestamp control parameter for a certain event of the specific termination in advance. In this case, the timestamp control parameter can also be used as a new flag in the event descriptor composition to identify whether to include the timestamp when reporting the event.

Nevertheless, in this preferred embodiment, the timestamp control parameter can be set repeatedly for an event of a certain type. In this case, the previously set timestamp control parameter is invalid, and the termination determines whether to include the timestamp when reporting the event according to the currently sent timestamp control parameter.

Meanwhile, embodiment 1 and embodiment 2 of the present disclosure may further operate such that when the MG does not support setting of the timestamp control parameter, the MG may return an error message to the initiator who sets the timestamp control parameter. The error message includes a code for identifying the error and/or a text for describing the error.

Moreover, the MGC may audit the timestamp control parameter on the MG to know the capability of the MG in reporting the timestamp of the event and/or the current setting and set the timestamp control parameter according to the audit result. For example, the MG reports to the MGC whether the MG supports mode of reporting a timestamp in the Requested, Suppressed, or Automatic mode. According to the information reported by the MG, the MGC can determine the timestamp control parameter to be sent to the MG. In another example, if the MGC requires the MG to report the timestamp of the event but the MG does not set the reporting of the timestamp, the timestamp control parameter should be set to Requested. If the MG does not support reporting of a timestamp, the timestamp control parameter is set to Suppressed. This makes it more convenient for the MGC to understand the relevant capabilities and settings of the MG, thus performing control in a more effective manner.

Figure 3:
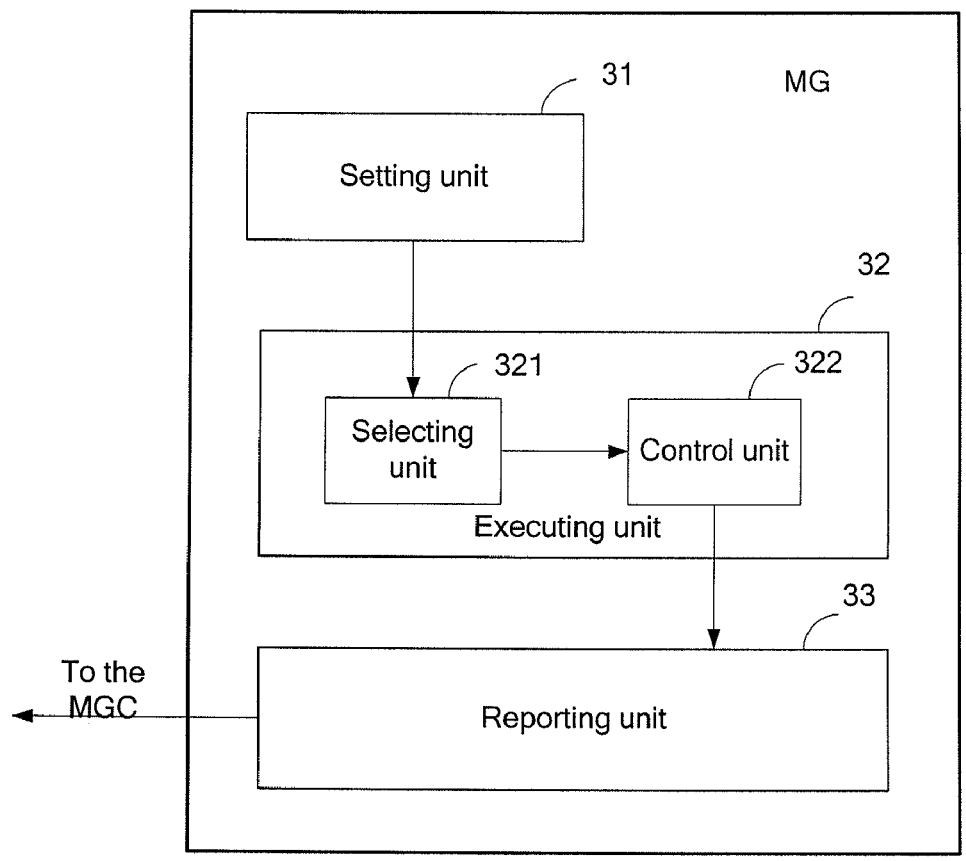
FIG. 3 is a structure diagram of an embodiment of a Media Gateway.

If the timestamp control parameter is preset on the MG, the structure of an MG includes a setting unit 31 and an executing unit 32 as shown in FIG. 3.

The setting unit 31 is adapted to set the timestamp control parameter, and the executing unit 32 is adapted to decide whether the MG reports the timestamp of the event according to the timestamp control parameter set by setting unit 31. The MG may further include a reporting unit 33 adapted to include the timestamp when reporting the event after executing unit 32 determines to report the timestamp of the event.

The executing unit 32 may include a selecting unit 321 and a control unit 322. The selecting unit 321 is adapted to operate such that if the timestamp control parameter is set to two or more values, the selecting unit 321 selects a timestamp control parameter for determining whether to report the timestamp and sends the selection result to the control unit 322. Accordingly, the control unit 322 is adapted to decide whether to report the timestamp according to the received timestamp control parameter. In this case, the reporting unit 33 carries the timestamp when reporting the event after the control unit 322 determines to report the timestamp of the event.

The control unit 322 is adapted to decide whether to report the timestamp according to the received timestamp control parameter. Specifically, if the value of the timestamp control parameter is set to Requested, the MG reports the timestamp. If the value of the timestamp control parameter is set to Suppressed, the MG does not report the timestamp. If the value of the timestamp control parameter is set to Automatic, the MG determines whether to report the timestamp independently.

The setting unit 31 may set the appearance of the timestamp control parameter. Accordingly, the executing unit 32 is adapted to: (i) report the timestamp when a timestamp control parameter appears, report no timestamp when no timestamp control parameter appears, or (ii) report a timestamp when no timestamp control parameter appears and report no timestamp when a timestamp control parameter appears.

The setting unit 31 and the executing unit 32 in the MG can also implement other technical features of the method embodiment. For details, see the relevant description about the method embodiment.

Figure 4:
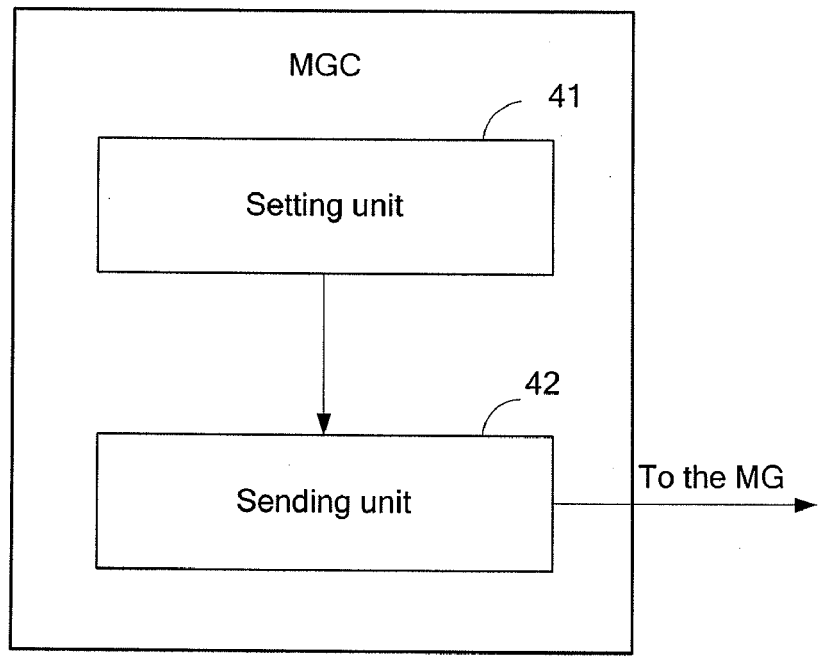
FIG. 4 is a structure diagram of an embodiment of a Media Gateway Controller.

If the timestamp control parameter of the MG is set according to the timestamp control parameter sent by the MGC to the MG, the structure of the MGC includes a setting unit 41 and a sending unit 42 as shown in FIG. 4. The setting unit 41 is adapted to set the timestamp control parameter; and the sending unit 42 is adapted to send the timestamp control parameter set by the setting unit 41 to the MG. In this case, the setting unit 31 in the MG sets the timestamp control parameter used by the setting unit according to the timestamp control parameter received from the MGC.

In the technical solution in an embodiment of the present disclosure, a timestamp control parameter is set so that the MG can decide whether to report the timestamp of the event according to the set timestamp control parameter, thus controlling the reporting of the timestamp of an event. The method in the embodiments of the present disclosure can control the MG to report the timestamp of an event, enable the MGC or other applications that require the timestamp of the event to determine the actual time when the event occurs according to the obtained timestamp, and control the reported event not to include the timestamp if the MGC or other applications do not need the timestamp of the event, thus saving the bandwidth resources and other system resources.

The preceding embodiments are exemplary embodiments of the present disclosure only and not intended to limit the present disclosure. Any modification, equivalent substitution, or improvement without departing from the spirit and principle of the present disclosure should be covered in the scope of protection of the present disclosure.

What is claimed is:

1. A method for controlling reporting of a timestamp of an event, comprising:
    sending, by a Media Gateway Controller, a timestamp control parameter to a Media Gateway, or presetting the timestamp control parameter on the Media Gateway, wherein value of the timestamp control parameter comprises at least one of the values of Requested, Suppressed, Automatic; and
    determining, according to the timestamp control parameter, by the Media Gateway, whether to include the timestamp parameter of the event when reporting the event wherein the Media Gateway determines to include the timestamp of the event if the value of the timestamp control parameter is Requested; the Media Gateway determines not to include the timestamp of the event when reporting the event, if the value of the timestamp control parameter is Suppressed; and the Media Gateway determines whether to include the timestamp of the event if the value of the timestamp control parameter is Automatic.

2. The method according to claim 1, wherein sending, by a Media Gateway Controller, the timestamp control parameter to the Media Gateway comprises:
    sending, by the Media Gateway Controller, the timestamp control parameter as a property parameter to the Media Gateway; or
    sending, by the Media Gateway Controller, the timestamp control parameter as a flag contained within an event descriptor to the Media Gateway.

3. The method of claim 1, wherein, when the value of the timestamp control parameter comprises two or more values, the method further comprises:
    selecting one value from the two or more values, by the Media Gateway, according to actual situation.

4. The method according to claim 1, wherein the determining, according to the timestamp control parameter, by the Media Gateway, whether to include the timestamp of the event when reporting the event comprises:
    when the timestamp control parameter is set for Root termination, determining, according to the timestamp control parameter, by the Media Gateway, whether to include the timestamp of the event when reporting any event;
    when the timestamp control parameter is set for normal termination, determining, according to the timestamp control parameter, by the Media Gateway, whether to include the timestamp of the event when reporting the event from the normal termination.

5. The method according to claim 1, wherein
    when the timestamp control parameter is set for an event, determining, according to the timestamp control parameter, by the Media Gateway, whether to include the timestamp of the event when reporting the set event.

6. The method according to claim 1, wherein, when the Media Gateway does not support the setting of the timestamp, responding, by the Media Gateway, with error information to an initiator which sets the timestamp control parameter.

7. The method according to claim 1, wherein if the MGC does not require the event timestamp to be carried in the event report, the timestamp control parameter is set to Suppressed, if the MGC requires the event timestamp to be carried in the event report, the timestamp control parameter is set to Requested, if the MGC does not care whether the event timestamp is carried in the event report, the timestamp control parameter is set to Automatic.

* * * * *

UNITED STATES PATENT AND TRADEMARK OFFICE
CERTIFICATE OF CORRECTION

| | | |
|---|---|---|
| PATENT NO. | : 8,116,322 B2 | Page 1 of 1 |
| APPLICATION NO. | : 12/354289 | |
| DATED | : February 14, 2012 | |
| INVENTOR(S) | : Lin | |

It is certified that error appears in the above-identified patent and that said Letters Patent is hereby corrected as shown below:

In the Claims

In column 7, claim 1, line 25, before "of the event when reporting" delete "parameter".

Signed and Sealed this
Third Day of April, 2012

David J. Kappos
*Director of the United States Patent and Trademark Office*